May 16, 1950     I. P. KRICK     2,508,273

WEATHER FORECASTING DEVICE

Filed March 30, 1948     3 Sheets-Sheet 1

Inventor
Irving P. Krick;
By R. S. Berry,
Attorney

May 16, 1950      I. P. KRICK      2,508,273  
WEATHER FORECASTING DEVICE  
Filed March 30, 1948      3 Sheets-Sheet 2

May 16, 1950     I. P. KRICK     2,508,273
WEATHER FORECASTING DEVICE

Filed March 30, 1948     3 Sheets—Sheet 3

Inventor
Irving P. Krick

Patented May 16, 1950

2,508,273

UNITED STATES PATENT OFFICE 2,508,273

WEATHER FORECASTING DEVICE

Irving P. Krick, Los Angeles, Calif.

Application March 30, 1948, Serial No. 18,049

5 Claims. (Cl. 35—74)

This invention relates to a device for forecasting or predicting weather conditions and has as its primary object the provision of a mechanical device whereby changes in the weather during a given period may be predetermined by observation of sky conditions and wind direction followed by manipulation of the device to obtain a reading of a weather forecast based upon the ascertained sky condition and wind direction.

Another object is to provide an arrangment in a weather forecasting device whereby it may be readily adapted for use in predicting weather conditions in any part of the world at any time of the year for a predetermined period.

Another object is to provide a device of the above character which is so operable that inexperienced persons can effectively determine within limits future weather conditions at the place where such persons are located.

A further object is to provide a weather forecasting device embodying pictorial representations of a series of sky conditions, preferably arranged in sequence from that of clear or fair to one of storm cloud formations, in association with an arrangement of designated compass points, and also embodying a relatively moveable element bearing an arrangement of indicia denoting various weather forecast conditions which is operable on proper manipulation thereof to a selected position, determined by a selection of a certain pictorial representation and a compass point associated therewith in accordance with the existing sky condition and wind direction, to dispose a particular indicia in a readable position to indicate a forecast of a change of weather.

With the foregoing objects in view, together with such other objects and advantages as may subsequently appear, the invention resides in the parts and in the combination, construction and arrangement of parts hereinafter described and claimed, and illustrated by way of example in the accompanying drawings in which:

Figure 1:
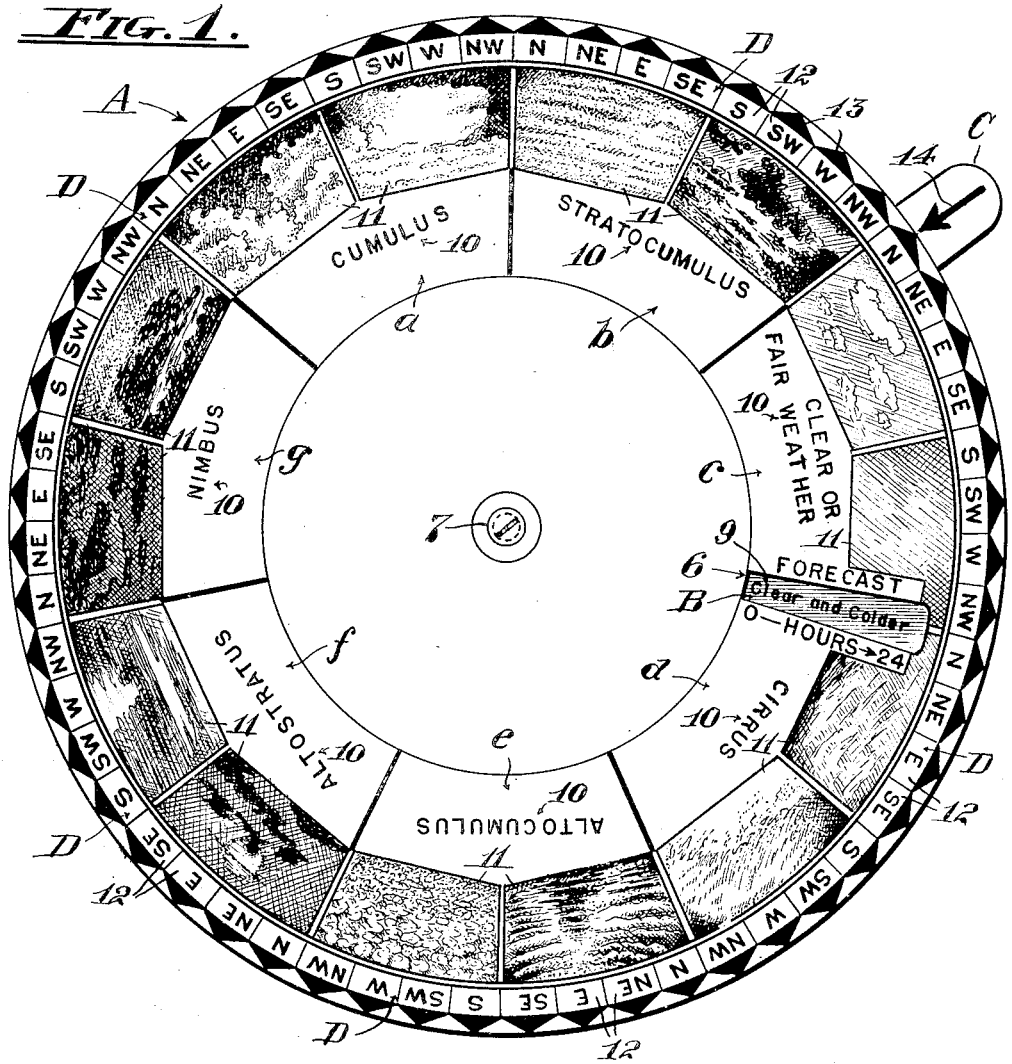
Fig. 1 is a plan view of one form of the device.
Figure 2:
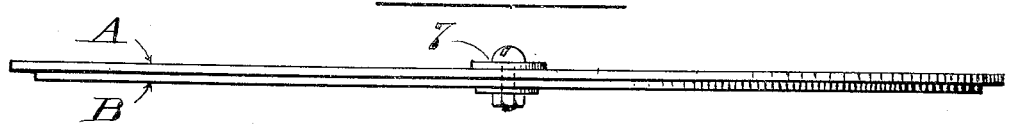
Fig. 2 is an elevational view thereof.
Figure 3:
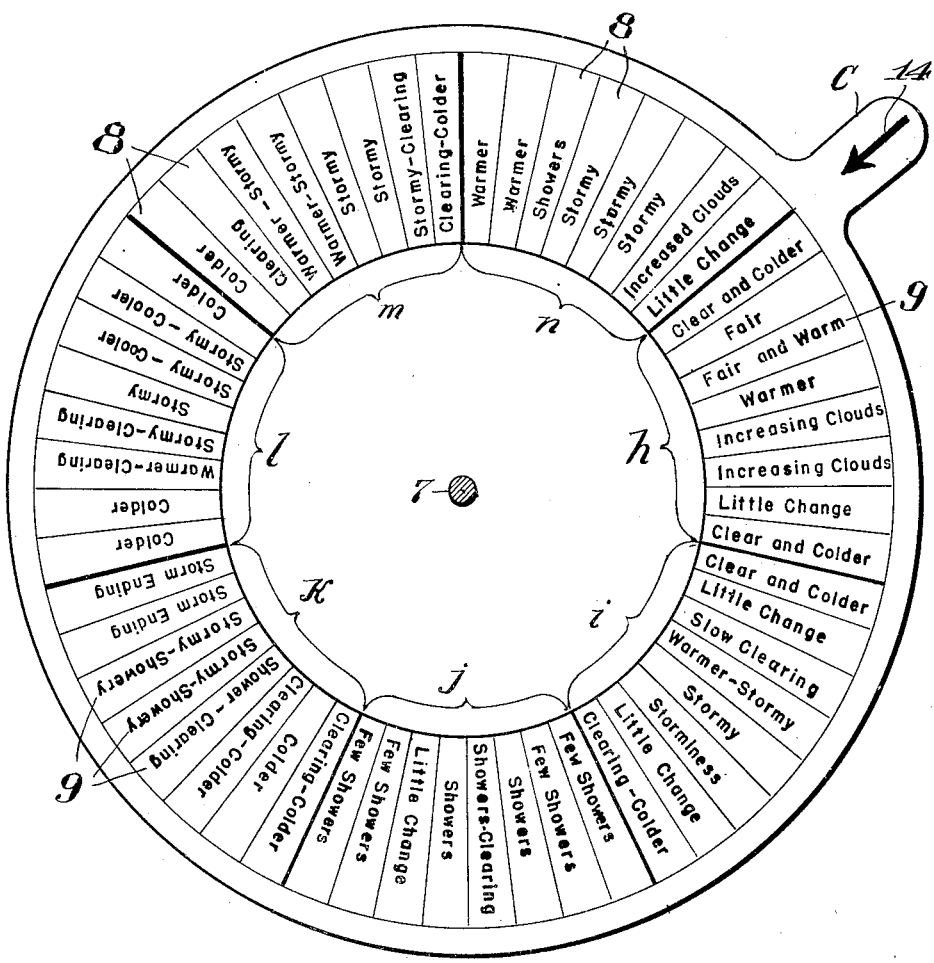
Fig. 3 is a plan view of a turnable disk embodied in the device carrying an arrangement of weather forecast indicia disposed thereon for exposure through a sight opening according to selected positioning of the disk relative to such opening.

Referring to Figs. 1 to 3 inclusive of the drawings, A indicates generally a chart comprising a circular plate one side of which, constituting the front face thereof, bears various indicia and pictorial illustrations of sky conditions or cloud formations as shown in Fig. 1 which will be later described. The plate A is formed with a radially extending sight opening 6 and revolubly mounted on the back of the plate A is a forecast delineating element comprising a disk B formed of sheet material having a flat face which is presented to the back of the plate A and overlies the sight opening 6 and which is pivotally connected to the plate A by a pivot 7 extending axially through the disk and plate and around which the disk may be turned to various positions relative to the back of the plate. The face of the disk B presented to the plate A is provided with a series of concentric radially extending defined areas 8 each of which is complementary to and is arranged to be exhibited through the sight opening 6; the areas 8 bearing indicia 9 denoting weather conditions. The areas 8 are covered or concealed by the plate A except one which is exposed through the sight opening 6. A handle C mounted on the disk B projects from the margin thereof beyond the margin of the plate A by means of which the disk B may be manually turned on the pivot 7 to various selected positions.

The front face of the plate A bears a series of defined consecutive segmental fields here shown as seven in number and designated respectively $a$, $b$, $c$, $d$, $e$, $f$ and $g$, each of which bears indicia 10 designating sky conditions or cloud formations together with a picture or pictures or pictorial representations 11 here shown as two in number, depicting the designated sky conditions or cloud formations.

In the arrangement here shown the field $a$ bears the indicia "Cumulus" together with pictures 11 of cloud formations so named. Area $b$ bears the indicia "Stratocumulus" together with pictures of the sky as containing clouds so named. Field $c$ bears the indicia "Clear or fair weather" with pictures of the sky with few or no clouds. Field $d$ bears the indicia "Cirrus" together with pictures of clouds so named. Field $e$ bears the indicia "Altocumulus" together with the pictures of clouds so named. The field $f$ bears indicia "Altostratus" together with clouds so named, and the field $g$ bears the indicia "Nimbus" with pictures of clouds so named.

While the series of pictures or pictorial representations may be disposed anywhere within the defined designated fields they are preferably arranged around the outer portion of the plate and presented toward the center of the plate with the indicia of the sky conditions or cloud formations arranged between the pictures and the center of the plate disposed so they may be read right side up as viewed across the center of the plate, and so that the several segments may be properly read when disposed at the upper part of the plate. The several segmental fields may also contain descriptive data applicable to the sky condition pictorially represented therein to further enable persons using the chart, as later described, to determine in what category a particular existing sky condition will lie and which data is not necessary to be here shown in the drawing. For example in the field designated Cumulus the following data would apply "Shower cloud of low or medium height with dark flat base and cauliflower shaped top often extending to a great height. May produce thunder storm." Data applied to the field designated Stratocumulus "Low white or grey clouds ranging in extent from patches or rolls to completely cloudy." Data applied to field designated Clear or fair weather is "Less than ¼ of sky covered by clouds." Data applied to the field designated Cirrus is "Very high clouds. Appears in wisps or thin milky white sheet often showing a ring around the sun or moon." The field designated Altocumulus may bear the data "Medium height cloud sheet in regular spaced globules or bands. Occasionally thick enough to obscure the sun." The field designated Altostratus may bear the data "Medium height cloud, flat, grey and in one or more layers. If sun visible, appears as through ground glass. "Light precipitation may fall." The field designated Nimbus may bear the following data "Low, heavy, dark, ragged cloud from which steady precipitation falls."

The outer margin of each segmental field a, b, c, d, e, f and g is formed with an arcuate border D extending contiguous to the fields designating cloud formations which border is divided into eight equal defined spaces 12 bearing indicia consisting of abbreviations designating the points of the compass namely, north, northeast, east, southeast, south, southwest, west and northwest. The designated points of the compass on the border of each segmental fields are for the purpose of designating wind directions.

Formed along the margin of the front face of the plate A is a series of triangular graduations 13, there being a graduation for each of the spaces designating a point of the compass with the tip of the graduation coinciding with the margin of the plate in radial relation to the center of the adjacent space 12. The handle C is fitted with an arrow or pointer 14 constituting an index or indicator the point of which is directed towards the margin of the plate A and is adapted to be positioned to coincide with the point of a graduation 13 and to indicate a selected point of the compass designating space 12 on the border D.

The handle C and its associated index 14 are arranged on the disk B in definite predetermined relation to certain designated segmental areas 8 on the disk B and the indicia on the areas 8 is such as to designate a forecast of weather change within a certain period of time as will be readable through the sight opening 6 when the index 14 is positioned to indicate a selected graduation 13 or space 12 with which the index is aligned in positioning the device for a reading, as will presently be described. The segmental areas 8 on the disk B are arranged in groups h, i, j, k, l, m, and n; there being one of such groups for association with each of the segmental fields a, b, c, d, e, f and g on the plate A. Eight of the areas 8 is provided in each of the said groups to afford an area 8 for each of the designated points of the compass associated with each of the segmental fields a, b, c, d, e, f and g on the plate A and the indicia 9 on each of such areas 8 designates a weather change which will occur when the wind is blowing from an ascertained direction with the sky in an ascertained condition in accordance with the representation of a given field on the plate A. Examples of such forecasting indicia are the words and statements "Few showers—Clearing colder," "Little change," "Showers—Clearing," "Light storminess," "Stormy," "Warmer—Stormy," "Warmer—Stormy—Slow clearing," "Clearing and colder," "Clear and colder," "Increasing clouds," "Warmer," "Fair and warm" and "Fair." The sight opening 6 is formed to expose and frame one of the forecasting indicia while the remainder of such indicia are concealed beneath the plate A.

Due to the different physical properties of the air currents in the atmosphere at various seasons of the year in different localities of the earth's surface the forecasts appearing on the disk B must be in accordance with such conditions and may be different for each season of the year in the different parts of the world.

However these conditions are ascertainable and the indicia 9 of the areas 8 on the disk B are laid out accordingly, it being possible to develop forecasts for any form of cloud sequence or any wind direction at any location on the earth and at any season of the year. The period of time covered by an individual forecast indicated adjacent the sight opening, here shown as being for "twenty-four (24) hours," but which manifestly may be varied as occasion may require.

In the operation of the invention, observation is first taken of the entire sky, whereupon one of the fields on the chart A bearing a picture 11 and description (if any) is selected on the device, best matching the observation. The direction from which the wind is blowing is then determined, or if there is no wind or a very light wind a predetermined direction according to locality is adopted, whereupon the index 14 is moved to this designated wind direction in the section containing the selected sky picture. The forecast will then appear in the sight opening 6.

In the example illustrated in the drawing the indicia 9 on disk B is laid out for use in the central Atlantic States for the seasons extending between December 15 and March 15. In the indicated reading, a clear or fair weather sky is observed and the wind direction determined as being from the north, the forecast reading for twenty-four (24) hours will be "Clear and colder."

Figure 4:
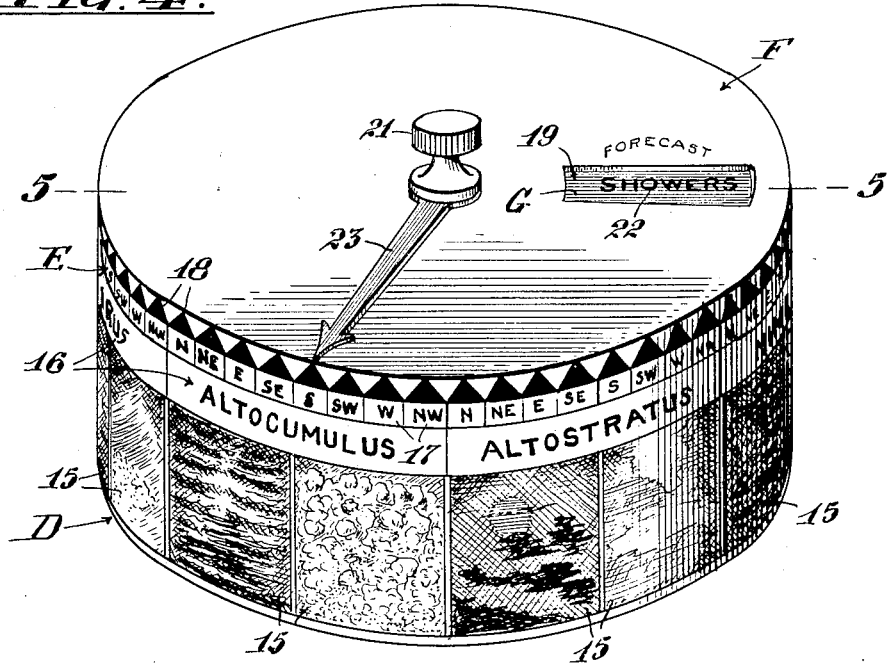
Fig. 4 is a perspective view showing another form of the device.
Figure 5:
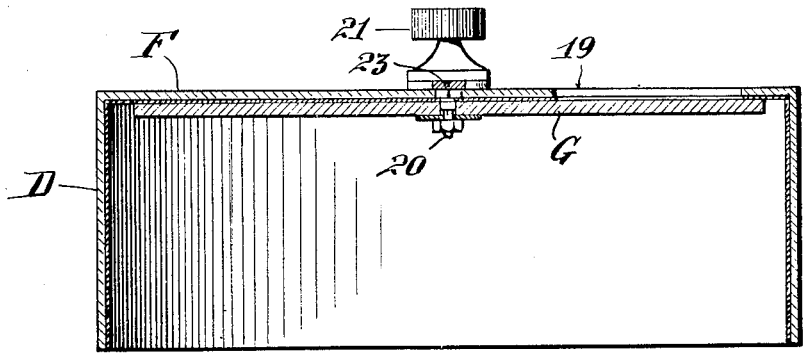
Fig. 5 is a view in cross section taken on the line 5—5 of Fig. 4.

In the form of the invention shown in Figs. 4 and 5, a cylindrical wall D, constituting a chart is provided around the periphery thereof with indicia of the character provided on the plate A in the form of the invention shown in Figs. 1 to 3 inclusive, here shown as embodying a series of consecutive defined fields bearing pictures or pictorial representations 15 of various sky conditions or cloud formations arranged in groups of two designated by appropriate indicia 16. Adjacent the upper margin of the wall D is a band E which is divided into defined spaces 17 bearing symbols representing the points of a compass, there being eight of such divisions associated with each of the two designated pictures 15 and reading in their order, N., NE., E., SE., S., SW., W., and NW. Along the upper margin of the wall D is a series of graduations 18 there being one for each 75 of the designated compass points.

A top wall or plate F affixed to the upper margin of the cylindrical wall D is formed with a sight opening 19 and arranged beneath the top wall is a disk G which is axially carried on a stem 20 extending centrally through the wall F and is fitted with a knob 21 by which the stem and the disk may be rotated. The disk G is complementary to the disk B, in being provided with a radial arrangement of indicia 22 arranged to be exposed through the sight opening 19 in the fashion described with reference to the disk B.

The stem 20 has affixed thereto an indicator comprising an index 23 the tip of which extends proximate the margin of the top wall F so as to indicate some one of the graduations 18 or spaces 17.

The operation of the form of the invention shown in Figs. 4 and 5 is the same principle as that described in connection with the device shown in Figs. 1, 2 and 3, except that in this instance the disk is rotated by means of the knob 21 and stem 20 to position the disk G to expose a particular indicia through the sight opening 19 to forecast a weather change according to a selected point of the compass indicating space 17 determined by an existing wind direction in conjunction with an ascertained sky condition represented by a selected portrayal on the cylinder D.

From the foregoing it will be seen that the device is characterized by the consecutive arrangement on the chart A of the several fields designating sky conditions or cloud formations with the border D extending along a margin of the field assembly carrying the consecutive arrangement of spaces 12 bearing points of the compass indicia, together with a moveable element B mounted on the chart carrying a series of consecutive areas bearing indicia of weather changes in an arrangement complementary to that of the fields and spaces on the chart, and in which the element has a path of travel in the direction of the length of said fields, spaces and areas, so that the areas on the element may be consecutively exposed through a sight opening in the chart, and whereby on positioning an index attached to the element to indicate a selected space 12 on the chart, a certain area on the element will be exposed through a sight opening formed on the chart to enable the observer to obtain a weather forecast.

While I have shown and described specific embodiments of my invention I do not limit myself to the exact details of construction set forth, and the invention embraces such changes and modifications and equivalents of the parts and their formation and arrangement as come within the purview of the appended claims.

I claim:

1. In a device for forecasting weather changes, a plate formed with a sight opening, revoluble disk on the back of said plate, a series of consecutive weather forecasting indicia on said disk exposable one at a time through said sight opening on revolving said disk, manually operable means for turning said disk to expose said indicia, a series of consecutive fields on said plate designating various sky conditions, means bordering each of said sky condition designated fields designating the several points of the compass, and an indicator fixed relative to said disk arranged for selectively indicating said compass points and a selected field on said plate.

2. In a device for forecasting weather changes, a chart bearing a series of successively arranged pictures illustrating various cloud formations, successively arranged defined spaces on said chart bordering each of said pictures bearing indicia denoting the points of the compass for designating wind direction, an element carried by said chart moveable on said chart in the direction of the length of the series of pictures and having a face presented to the back of the chart, an index on said element moveable along said series of pictures and said defined spaces for designating a particular wind direction relative to a cloud condition illustrated by the adjacent picture, said chart having a sight opening exposing the face of said moveable element presented to the back of the chart, and a series of consecutive weather forecasting indicia on said face of the moveable element arranged to be successively exposed one at a time through said sight opening; each of said weather forecasting indicia designating an expected change in weather condition represented by a particular cloud picture and wind direction designated by said index.

3. In a device for forecasting weather changes, a chart bearing a series of consecutive defined cloud depicting fields picturing various conditions of clouds in the sky, a group of spaces bordering with each of said cloud depicting fields bearing indicia denoting the points of the compass for designating wind directions, a moveable element carried by said chart bearing consecutive indicia denoting a plurality of forecasts of weather changes, said element being moveable in the direction of the length of said fields, a plate associated with said chart covering said moveable element having a sight opening arranged to expose one only of the weather forecasting indicia on said moveable element, said moveable element being moveable relative to said chart to expose the weather forecasting indicia successively through said sight opening on moving said moveable element relative to the chart, and an index affixed to said moveable element arranged to indicate one of said cloud depicting fields and at the same time designate one of said points of the compass denoting the direction of wind designating spaces; said cloud depicting fields, point of the compass denoting spaces, weather forecasting indicia and sight opening being arranged so that on positioning the moveable element with the index designating a particular cloud depicting field and a point of the compass and wind direction designated space, a particular weather forecasting indicia will be exposed through said sight opening according to the cloud picture and wind direction designated by the index.

4. In a device for forecasting weather changes, a chart bearing a series of consecutive defined fields carrying indicia representative of various cloud formations together with one indicating a clear sky, said fields collectively having a margin embodying a series of defined spaces arranged consecutively in a row, there being a group of an equal number of said spaces extending in alignment along the margin of each of said fields and bearing indicia designating the points of the compass, a moveable element carried by said chart, said element being sheet like in form and having a flat face carrying a series of consecutively arranged areas bearing indicia denoting weather changes, said element having a path of travel in the direction of the length of said series of fields, said chart including a wall portion overlying said face having a sight opening arranged to expose said areas consecutively one at a time on advancing said element relative to said chart, manually operable means for moving said element relative to the chart to expose a certain of said change of weather denoting areas through said slot, and an index fixed on said element pointing toward said margin for designating a selected point of the compass space thereon; said change of weather denoting areas and index on said element, and said sight opening and point of the compass spaces on said chart being relatively arranged so that when the moveable element is disposed with the index pointing to a point of the compass space and one of the fields, a single change of the weather denoting area on said element will be exposed through said sight opening.

5. In a device for forecasting weather changes, a chart bearing a series of consecutive defined fields carrying indicia representative of various cloud formations together with one indicating a clear sky, said fields having a margin embodying a series of defined spaces arranged consecutively in a row, there being a group of an equal number of said spaces extending in alignment along the margin of each of said fields and bearing indicia designating the points of the compass, said chart embodying a wall portion formed with a sight opening, a moveable element carried by said chart rearward of and contiguous said wall portion, said element being moveable in the direction of the length of said series of fields and having a face overlying said sight opening, said face bearing a series of consecutively arranged areas bearing indicia denoting weather changes, there being one of such areas provided on said element in cooperative relation to each of said point of the compass designating spaces on said chart, said areas being arranged relative to said sight opening to register consecutively therewith on advancing said element, an index fixed on said element pointing toward a certain of the point of the compass spaces on said margin, and manually operable means for moving said element relative to the chart to dispose said index to point to a selected field and point of the compass space on the margin thereof and at the same time expose a companion weather change denoting areas on said element through said sight opening.

IRVING P. KRICK.

REFERENCES CITED

The following references are of record in the file of this patent:

UNITED STATES PATENTS

| Number | Name | Date |
|---|---|---|
| 631,161 | Froehlich et al. | Aug. 15, 1899 |
| 1,456,155 | Slauson | May 22, 1923 |
| 1,516,097 | Hamilton | Nov. 18, 1924 |
| 1,578,665 | Kantor | Mar. 30, 1926 |
| 2,098,003 | Hassenfeld | Nov. 2, 1937 |
| 2,385,732 | Redding | Sept. 25, 1945 |

FOREIGN PATENTS

| Number | Country | Date |
|---|---|---|
| 6,276 | Great Britain | Apr. 27, 1915 |
| 83,369 | Sweden | Mar. 7, 1935 |